United States Patent Office 3,720,718
Patented Mar. 13, 1973

3,720,718
CONVERSION OF CHLOROFORMATES
TO AN ALDEHYDE
Donald M. Fenton, Anaheim, Calif., assignor to Union
Oil Company of California, Los Angeles, Calif.
No Drawing. Filed Aug. 12, 1970, Ser. No. 63,309
Int. Cl. C07c 45/00
U.S. Cl. 260—601 R                 10 Claims

ABSTRACT OF THE DISCLOSURE

An aldehyde is prepared by contacting a chloroformate with a liquid reaction medium containing a Group VIII noble metal catalyst in complex association with a biphyllic ligand at a temperature between 75° C. and 400° C. and at a pressure sufficient to maintain liquid phase reaction conditions. The chloroformate decomposes to form the aldehyde, hydrogen chloride and carbon monoxide. A typical process comprises contacting ethyl chloroformate with a reaction medium containing palladium chloride in complex association with triphenylphosphine to produce acetaldehyde. The invention has utility in the manufacture of an aldehyde by reacting an alcohol with phosgene to produce a chloroformate which is then converted to an aldehyde by the process of the invention.

---

The invention relates to a process for preparing an aldehyde. More particularly the invention relates to the formation of an aldehyde by decomposing a chloroformate.

Aldehydes may be prepared in a variety of manner according to known prior art processes. One method is to oxidize an alcohol. The disadvantage of the prior art method is that in the oxidation undesirable amounts of acid and tar products are formed. Accordingly, it would be an improvement in the art to produce an aldehyde from an alcohol under non-oxidizing conditions.

The process of the invention can be utilized to attain the above-stated objective. An alcohol is first reacted with phosgene (COCl$_2$), to form a chloroformate according to known prior art methods. The chloroformate is then contacted with the catalyst of the invention and is converted to an aldehyde, hydrogen chloride, and carbon monoxide. The hydrogen chloride byproduct is oxidized in a separate vessel to chlorine which can be reacted with the carbon monoxide byproduct according to known processes to form phosgene which can be utilized in the above-described process. Accordingly, the net reaction of the process is that an alcohol is converted to an aldehyde. The hydrogen chloride oxidation to chlorine can be performed in the absence of the alcohol so that little or no byproducts of an alcohol oxidation are formed.

The reaction of the invention proceeds according to the following equation:

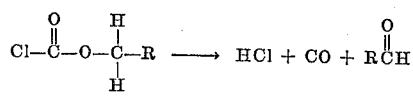

The chloroformate reactant of the invention contains 3 to 24 carbons preferably 3 to 12 carbons and has the following general structure

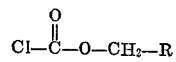

wherein R is alkyl, cycloalkyl, alkylcycloalkyl, cycloalkylalkyl, aryl, aralkyl, or alkaryl, preferably alkyl.

Examples of suitable R groups are methyl, ethyl, octyl, dodecyl, hexyldecyl, eicosyl, cyclobutyl, cyclohexyl, cyclododecyl, 3,4,5 - tripropylcyclohexyl, 5-cyclopentylnonyl, 1,3-methylcyclohexyl, phenyl, tolyl, xylyl, 4-phenyloctyl, 3-tolyl-5-cyclohexylnonyl, etc.

Examples of suitable chloroformates include ethyl chloroformate, propyl chloroformate, butyl chloroformate, pentyl chloroformate, hexyl chloroformate, heptyl chloroformate, octyl chloroformate, dodecyl chloroformate, hexadecyl chloroformate, nonadecyl chloroformate, 3-butyl - 4 - hexylnonyl chloroformate, cyclobutylmethyl chloroformate, 2-cyclohexylethyl chloroformate, 3-cycloheptylnonyl chloroformate, 2-phenylpropyl chloroformate, 3-phenyloctyl chloroformate, 4-cyclohexyldodecyl chloroformate, 2-tolyl-3-butyl-6-cyclohexyloctyl chloroformate, 3-cyclobutyl-3-phenyldecyl chloroformate.

The catalyst of the invention comprises a Group VIII noble metal which is preferably in complex association with a biphyllic ligand. A biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands can comprise organic compounds having at least about 3 carbons and containing arsenic, antimony, phosphorus or bismuth in a trivalent state. These ligands are known in the art and, accordingly, are not part of the essence of the invention. Of these the phosphorus compounds, i.e., the phosphines, are preferred; however, the arsines, stibines and bismuthines can also be employed. Typical of the suitable ligands are those having the following structure:

wherein E is trivalent phosphorus, arsenic, antimony or bismuth; and
wherein R is the same or different alkyl having 1 to 18 carbons, cycloalkyl having 4 to 18 carbons and/or aryl having 6 to 18 carbons. Examples of which are methyl, butyl, nonyl, cyclohexyl, cyclodecyl, phenyl, tolyl, xylyl, 2 - phenyl-4-butyloctyl, tetramethylphenyl, etc. Preferably at least one R is aryl e.g., phenyl, tolyl, xylyl, etc., preferably having 6 to 9 carbons and, most preferably, the ligand is triaryl.

Examples of suitable biphyllic ligands having the aforementioned structure and useful in my invention to stabilize the catalyst composition are the following:

trimethylphosphine,
triethylarsine,
triethylbismuthine,
triisopropylstibine,
dioctylcycloheptylphosphine,
tricyclohexylphosphine,
ethyldiisopropylstibine,
tricyclohexylphosphine,
methyldiphenylphosphine,
methyldiphenylstibine,
triphenylphosphine,
triphenylbismuthine,
tri(o-tolyl)-phosphine,
phenyldiisopropylphosphine,
phenyldiamylphosphine,
ethyldiphenylphosphine,
phenylditolylphosphine,
xylyldiphenylarsine,
tolyldi(m-xylyl)stibine,
trixylylphosphine,
trixylylarsine,
trixylylstibine,
cyclopentyldixylylstibine,
dioctylphenylphosphine,
tridurylphosphine,
trixylylbismuthine, etc. Of the aforementioned the aryl phosphines are particularly the triarylphosphine (e.g., triphenylphosphine) are preferred because of their greater activity.

The Group VIII metal may be ruthenium, rhodium, palladium, osmium, iridium, or platinum. A catalytic quantity of the metal is added (e.g., 0.002-2% of the reaction medium) and the metal may be added in any convenient manner such as a soluble salt, complex, acid, or oxide, preferably as a salt such as a halide (chloride, bromide, fluoride, iodide), nitrate, nitrite, acetate, propionate, butyrate, valerate the particular source of the metal or element not being part of the essence of the invention.

The Group VIII metal may be complexed with the above-described biphyllic ligand before being introduced into the reaction medium or the complex may be formed "in situ" by simply adding a compound of the metal and the biphyllic ligand directly into the reaction medium. In either case it is generally preferable that the quantity of biphyllic ligand be in excess (e.g., 10-300%) of that stoichiometrically required to form a complex with the Group VIII metal. The complex has from 1 to about 5 moles of biphyllic ligand per atom of the metal and other components such as hydride, or soluble anions such as sulfate, nitrate, $C_1$-$C_5$ carboxylates (e.g., acetate, propionate, isobutyrate, valerate, etc.), halide, etc., may be but need not be included in the complex catalyst of this invention. These components may be incorporated in the catalyst by the formation of the catalyst complex from a Group VIII metal salt of the indicated anions.

Examples of suitable sources of the noble metals are as follows: iridium carbonyl chloride, iridium carbonyl hydride, iridium carbonyl, iridium tetrabromide, iridium tribromide, iridium trifluoride, iridium trichloride, osmium trichloride, chloroosmic acid, palladium hydride, palladium oxide, palladous chloride, palladous cyanide, palladous iodide, osmium isopropionate, iridium valerate, palladium acetate, palladous nitrate, platinic acid, platinous iodide, palladium cyanide, sodium hexachloroplatinate, potassium trichloroethylene)platinate(II), chloropentaaminorhodium(III) chloride, rhodium dicarbonyl chloride dimer, rhodium nitrate, rhodium trichloride, rhodium carbonyl hydride, ruthenium trichloride, tetraaminorutheniumhydroxychloro chloride; etc.

The reaction is performed under liquid phase conditions and may be performed in a liquid organic solvent (i.e., has a solvency for the reactants and the catalyst) inert to the reactants, products and to the reaction conditions. Suitable solvents include, for example, hydrocarbons, ketones, and ethers. Examples of the foregoing are pentane, hexane, heptane, isooctane, naphtha, cyclohexane, idane, benzene, toluene, xylene, durene, pseudocumene, tetralin, acetone, diethyl ketone, diisopropyl ketone, methyl-n-amyl ketone, cyclohexanone, di-iso-propyl ether, di-n-butyl ether, ethylene glycol di-iso-butyl ether, methyl o-tolyl ether, diethyl ether, etc. Preferably, however, the reaction is conducted in the absence of a solvent in which case the reaction can be conducted such that a substantial amount of the chloroformate reactant may be present by, for example, in the batch process, terminating the reaction prior to most of the chloroformate being decomposed, or for example in the continuous process, adding sufficient chloroformate into the contacting zone to maintain the required carbonate level.

The reaction may be performed at relatively low temperatures, e.g., 100° to 400° C. and preferably 150° to 250° C. and at low pressures, e.g., 1 to 30 atmospheres, preferably 4 to 10 atmospheres (the pressures herein being on an "absolute" basis as opposed to a "gauge" basis) and sufficient to maintain liquid reaction conditions. The decomposition releases gaseous carbon monoxide and therefore lower pressures, in addition to higher temperatures, favor the decomposition. Hence, the reaction is preferably performed at the lowest pressure required to maintain liquid phase at the reaction temperature and the optimization of the rate of decomposition involves correlating temperature and pressure in conventional manner. The gas phase can comprise chiefly the generated carbon monoxide, however, an inert gas such as nitrogen may also be introduced into the reaction zone in order to provide the necessary pressure and to reduce the partial pressure of carbon monoxide to a low value, e.g., from 0.1 to 50 percent of the total pressure. The necessary heat can be supplied by circulating part of the medium through a heater in indirect heat exchange with steam or with other suitable heating fluids.

The reaction may be carried out in a "batch" or in a continuous process. In the batch process, the reaction is continued until a substantial amount or all of the chloroformate has decomposed with the excess carbon monoxide being vented to the atmosphere. The products, reactant chloroformate, catalyst and solvent, if any, are separated by conventional means (e.g., distillation). In the continuous process, chloroformate is continuously fed into the reaction zone, the carbon monoxide vented and a slip stream of the reactant, products, catalyst and solvent, if any, is continuously withdrawn and separated by distillation. The reactant, catalyst and solvent, if any, are then recycled to the reaction zone.

The following examples will serve to illustrate the practice of the invention, however, the invention should not be limited to the process described therein:

EXAMPLE 1

This example illustrates a preferred embodiment of the invention and the results actually obtained.

To a 300 milliliter bomb were added 25 milliliters ethyl chloroformate and 2 grams of palladium tetrakis triphenylphosphine. The bomb was pressured with ethylene to about 40 atmospheres and with carbon monoxide to about 50 atmospheres. The mixture was rocked and heated to about 120° C. for about 4 hours. The mixture was cooled, the liquid contents removed and analyzed to reveal that 4 grams of acetaldehyde were formed in the process.

EXAMPLE 2

The following example illustrates other embodiments of the invention presently contemplated:

To a bomb are added 100 milliliters of octyl chloroformate, 10 grams of rhodium trichloride and 50 grams of tricyclohexylarsine. The autoclave is heated to about 200° C. and pressured with nitrogen to about 50 atmospheres. The liquid contents are removed and octanal is recovered from the reaction medium by distillation.

Ethyl alcohol and phosgene are reacted in a conventional non-catalytic process to reduce ethyl chloroformate. The ethyl chloroformate is transferred to a bomb containing 10 grams of iridium trichloride and 15 grams of tritolyl phosphine. The autoclave is pressured with nitrogen to 15 atmospheres and heated to and maintained at 200° C. for five hours. The liquid contents are removed and actaldehyde is recovered by distillation.

Benzyl chloroformate, produced by reacting benzyl alcohol with phosgene, is contacted with a liquid reaction medium containing palladium trichloride and triphenylphosphine in an autoclave. The autoclave is pressured with nitrogen to 20 atmospheres and heated to and maintained at 300° C. for 4 hours. The reaction medium is removed and benzyl aldehyde recovered by distillation.

To a bomb is added 200 milliliters of 3-phenyl-5-cyclohexyldecyl chloroformate, 10 grams of platinum chloride and 15 grams of tributylphosphine. The bomb is pressured with nitrogen to 50 atmospheres and heated to, and maintained at, 400° C. for 10 hours. The liquid contents are removed and 3-phenyl-5-cyclohexyldecanal recovered by distillation.

I claim:

1. The process wherein an aldehyde is prepared by contacting a chloroformate having 3 to 25 carbons and having the formula:

$$Cl-\underset{\underset{O}{\|}}{C}-O-CH_2-R$$

wherein R is alkyl, cycloalkyl, alkylcycloalkyl, cycloalkylalkyl or monocyclic aryl, aralkyl, or alkaryl in a liquid reaction medium containing a minor amount of a Group VIII noble metal in complex association with from 1 to 5 molar equivalents of a biphyllic ligand having the formula:

$$ER_3$$

wherein E is trivalent phosphorus, arsenic, antimony or bismuth; and wherein R is the same or different alkyl having 1 to 18 carbons, cycloalkyl having 4 to 18 carbons and/or aryl having 6 to 18 carbons, at a temperature between 100° and 400° C. and at a pressure sufficient to maintain liquid phase reaction conditions.

2. The process of claim 1 wherein the Group VIII noble metal is palladium.

3. The process of claim 1 wherein the biphyllic ligand is triarylphosphine and wherein R of said ligand has 6 to about 9 carbons.

4. The process of claim 3 wherein said ligand is triphenylphosphine.

5. The process of claim 3 wherein the Group VIII noble metal is palladium.

6. The process of claim 1 wherein the chloroformate is an alkyl chloroformate.

7. The process of claim 1 wherein the chloroformate is ethyl chloroformate.

8. The process of claim 1 wherein said biphyllic ligand is present in an excess amount from 10 to 300 percent of that stoichiometrically required to form said complex.

9. The process of claim 1 wherein said chloroformate has from 3 to 12 carbons.

10. The process of claim 1 wherein said reaction is performed at a temperature from 150° to 250° C.

References Cited

Tsuji et al., JACS, vol. 90, 1968, pp. 94–98.

Piancenti et al., Chemistry and Industry, October 1960, pp. 1240–1241.

BERNARD HELFIN, Primary Examiner

R. H. LILES, Assistant Examiner

U.S. Cl. X.R.

260—598, 599